Oct. 22, 1929.　　　D. BUTCHER　　　1,732,739
ARTIFICIAL FLOWERS AND PROCESS OF MAKING THE SAME
Filed March 14, 1928
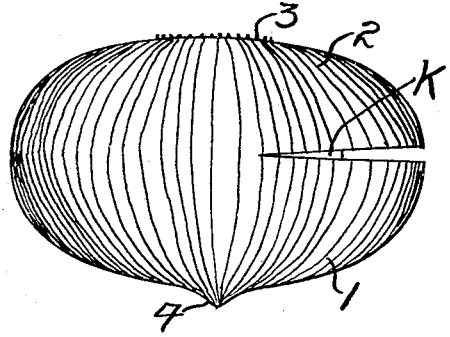
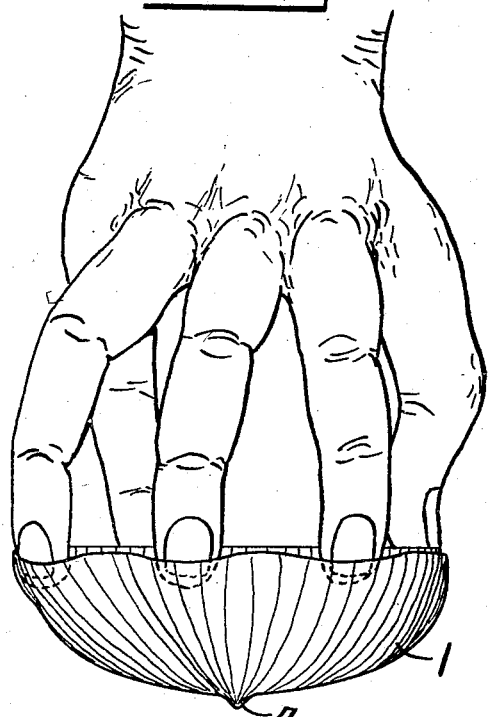
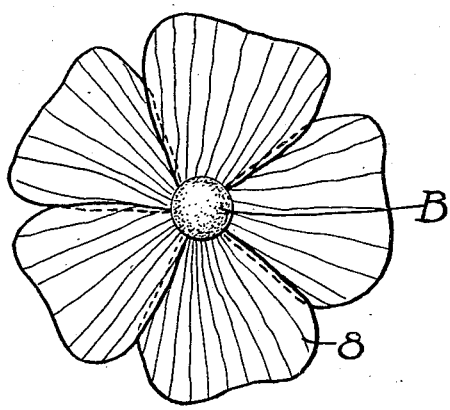
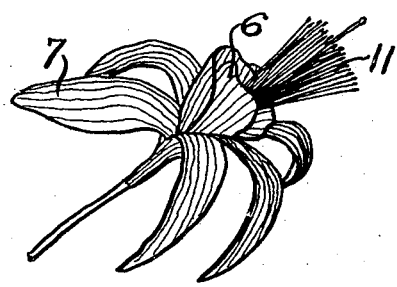
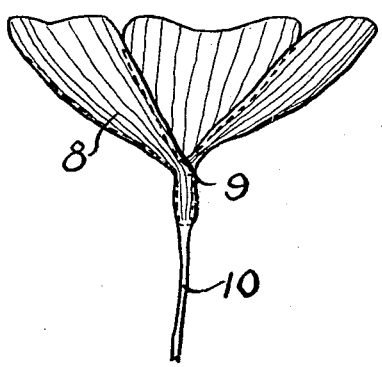
Inventor
Della Butcher
By Reynolds+Reynolds
Attorneys Patented Oct. 22, 1929

1,732,739

UNITED STATES PATENT OFFICE

DELLA BUTCHER, OF CHEHALIS, WASHINGTON

ARTIFICIAL FLOWERS AND PROCESS OF MAKING THE SAME

Application filed March 14, 1928. Serial No. 261,450.

My invention, or discovery, relates to the manufacture of artificial flowers, and has for its principal object the manufacture of flowers which in their veining and general appearance closely simulate the natural flower, and which are of fine texture, capable of being curled or molded into various shapes, more or less flexible and durable, and capable of being colored in various colors to represent the natural flower. Such flowers are intended for home decoration, for personal adornment, and for other uses to which natural or artificial flowers are put.

A further object is the production of an artificial flower of the general character described from a natural vegetable product, which is abundant and cheap, and which is not difficult to work.

My invention comprises the novel article and the novel process of preparing the same, as described in this specification and as defined by the claims accompanying the same; the drawings illustrate the article and the method of its manufacture.

Figure 1 illustrates the first stage of the process and Figure 2 the next stage.

Figures 3 and 4 are respectively plan and an elevation of a completed flower of one type, while Figure 5 is a similar view of a completed flower of a different type.

Heretofore, in the manufacture of artificial flowers, considerable time and skill has been employed in shaping the petals properly, but owing to the texture of the fabric or other materials used (heightened in some cases by the paint or dye employed), the flowers have not appeared natural, but rather thick and heavy and unnatural. Such flowers are usually made of a woven fabric, and thus can have no veining such as naturally occurs in the petals and sepals of a flower, except such as may be supplied by painting, the unnaturalness of which is self-apparent.

I have discovered that flowers of all types, shapes, sizes and varieties, may be made from the skins of bulbous roots, such as the onion, hyacinth, crocus, gladiolus, garlic, leeks, etc., to incorporate into the petal or sepal the natural veining of the bulb's skin, to simulate the natural veining of the flower petal, and hence when made up into the artificial flower, even though painted, dyed, or otherwise colored or preserved, this veining will appear as an undertone or background, and the natural fine texture of the skin will give to the flower thus made up a naturalness which cannot be approached by other artificial flowers of which I am aware.

As I have noted above, the skin of various bulbs of the genus allium, or allied bulbs of the order liliaceae, will be found suitable for such purposes, but ordinarily it will be uneconomical to employ other than onion skins, garlic skins, or the skins of like bulbs which are comparatively plentiful and cheap. Therefore, while I shall describe the process and the product as relates to manufacture from onion skins, it will be understood that this is illustrative only, and not definitive. It should also be understood that the term petals may also include the sepals of a flower, for the sepals of narcissus, for example, are particularly well imitated by the use of these onion skins.

Briefly, my process consists in preparing an onion, by removing the brittle and dried outer skin, then either scoring the onion circumferentially to cut through the outer layers of its skin, or cutting the onion squarely across, so as to divide it into an upper part and a lower part, or otherwise cutting through the outer skins so that they may be separated from the body of the onion. Usually the onion would be cut in halves, at the plane of its greatest transverse diameter; this first step is illustrated in Figure 1, where a knife K is shown cutting an onion into the upper half 1 and lower half 2.

Ordinarily, the upper half only would be used, but this is for two reasons, first, that the lower half 2 has thereon the remains of the root structure as indicated at 3 and this would fall in the center of the finished flower and would, therefore, offer no means of supporting the petal, and second, that the delicate veining is not so pronounced as it is at the base of the stem, and it is this veining which is particularly desirable in the petals. The upper half 1 has the remains of the stem of the onion, as indicated at 4, and this offers a means for supporting the petals and of securing them to a stem. In some instances, however, I may skin back the skin from the lower half, cutting through the base of the roots at 3, and these roots themselves within the cupped skin, will simulate stamens.

Assume, then, that the upper half 1 is taken; its outer skin is separated from the remainder of the onion in some suitable fashion, as, for example, by the insertion of the tips of the fingers beneath the skin, and then it is worked off with a somewhat rotary and prying motion of the fingers relative to the onion half 1. It will be obvious that any suitable instrument might be used for this purpose, and one may well be used to start the skin, but the fingers are best employed throughout the operation, for the reason that the operator can always feel if too great a strain is being placed on the skin, which usually it is desired to remove intact, without splitting or breaking. For certain flowers, of course, such as pansies, roses, dogwood, and others, wherein the petals do not extend entirely about the circumference of the flower, the petals may be formed of broken or split segments of the skin, but for such flowers as poppies, the petals of which are cup shaped, it is essential that the skin be not broken. The operation of removing the skin is illustrated in Figure 2, except as the skin may be thrown back from the lower half 2 to permit cutting through the roots, or when the entire skin, from root to tip is employed. In the latter case, it may be slit longitudinally of the lower half, and then the lower half skinned off in the usual manner.

Now, with the skin removed, it may at once be shaped by cutting, folding, curling or like operations. For making carnations, for example, the skin when freshly removed may be folded and then serrated at its edges to show the jagged effect of the carnation petals, and may then be crushed into a compact mass. For the dogwood, illustrated in Figures 3 and 4, the petals may simply be cut to shape, retaining the natural curvature of the skin. For roses, where it is desired to have the edges curled, they may be curled over while the skin is still fresh and moist—for example, in Figure 5, is illustrated the blossom of a fuchsia, wherein the petals 6 were shaped by cutting and folding when freshly removed, and the sepals 7 were cut to shape from a single skin and then curled backward.

After any shaping operation which may be required has been completed, the skins are laid away to dry. It is desirable, of course, that they be not dried so rapidly as to cause them to become brittle, or crack, or to crinkle, and ordinarily such drying requires a week or two. The slower the drying, the less likely are the skins to become brittle, although after drying they can be toughened by dipping or boiling for a short time in hot water, hot oil, or melted paraffine. Drying in the dark tends to enrich the reddish or maroon color which the skins take on. For cupped flowers, as tulips, the skins may be somewhat held in shape while drying, as by placing them in a cup or glass. This has the further advantage of preventing too free access of air to the skins, and slows up the drying. The skins, when dry, have no semblance of odor.

They are then ready to be incorporated into the flower, and this is done in any manner which is found desirable or necessary by the structure of the particular flower, and in thus making up the flower the teaching of the millinery art may be followed, to a large extent. However, it will be evident, from Figure 4, particularly, that the various petals 8 each have the end 9, which formed a part of the tip 4 of the onion, and these ends 9 may be grouped about a wire 10, or like support, and be bound, or glued, or held in place by wax, or in fact in any manner which is employed in the manufacture of artificial flowers from other material.

In many instances the petals, when dried, will be found to have a light reddish or even a buff color, which closely simulates certain flowers; for example, artificial roses, poppies, dogwood blossoms, pansies, dahlias, and the like, may be made up in this fashion and no coloring is required. Other flowers, of course, and varieties of the flowers named, will require coloring, and this may be done in various ways and at different stages in the process. Usually, if there is to be a background color, this may be applied by painting or dyeing the petals before their formation into the flower form. I have found that this may be done advantageously by keeping the flower petals for a time in a warm dye solution. They may be dipped in colored wax, or paraffine, but this is ordinarily not desirable, inasmuch as it tends to impart a gloss to the petals which is unnatural; however, dipping in paraffine, wax, or boiling water or oil, tends to preserve the petal, and for this reason may be found desirable in some instances.

Where there is a color to be superimposed on the ground color of the petal, or where centers are to be put in, as in pansies, geraniums, amaryllis and the like, it will usually be found best to apply these by painting after the flower has been made up. It will be understood, of course, that the entire coloring of the flower may be done by painting in this manner.

Various sorts of centers will be employed for such flowers as require them—for example, in the dogwood shown in Figure 3 an ordinary brown velvet covered button B is employed upon the end of a wire stem. In Figure 5 the group of stamens and pistil of the fuchsia, indicated at 11, is supplied by thread or light wires, which are bound in with the petal 6 and sepals 7. Centers may be formed of the roots, lying within the cupped skin of the lower half 2.

In case it is desired to further shape a petal after it has dried, this may be done by dipping the petal, or the part thereof to be formed, in warm water, to soften and moisten it after which it can be formed in the shape desired. In flowers with indented or spiked petals, such as narcissus, daffodils, fuchsias, amaryllis, etc., the petals may be shaped first by folding the skin when it is moist and then cutting to shape. The fold should be kept on the veining lines of the onion skin, and flowers such as the fuchsia, where the sepals 7 curve backwards, must be cut deeply enough to make the backward turn desired.

The process described above can be employed with bulbs of all shapes and sizes; even small onion sets can be employed in this manner, as these make up geraniums, apple blossoms and the like of very natural appearance.

What I claim as my invention is:—

1. The process of making artificial flowers which consists in removing the outer skin of an onion or like bulb, drying the skin, toughening the skin by dipping in a hot liquid, and finally assembling upon a support.

2. The process of making artificial flowers which consists in cutting transversely through the outer skin of an onion or like bulb to divide such skin into upper and lower portions, separating the skin thus cut through from the body of the bulb, shaping the removed skin as desired, drying the shaped skin, and assembling upon a support.

3. Those steps in the process of making artificial flowers from the skins of onions or like bulbs, which consist in cutting transversely through the outer whole skin of the bulb, and separating the skin thus cut through from the body of the bulb, folding the skin along the vein lines to the width of petal desired, and shaping the petals, prior to drying.

4. An artificial flower comprising petals of the skin of an onion or like bulb, shaped and curled to simulate the natural flower, and dried to retain such shape, and a central support about which such petals are grouped, the petals being so supported thereon that the natural veining of the skins radiates from the center of the flower.

Signed at Chehalis, Lewis County, Washington, this 8th day of March, 1928.

Mrs. DELLA BUTCHER.